United States Patent [19]

Tsuchie

[11] Patent Number: 4,702,486
[45] Date of Patent: Oct. 27, 1987

[54] DRIVING DEVICE FOR BICYCLE

[76] Inventor: Kimihiro Tsuchie, 35-1 Kinugasa Tenjinmori-cho, Kita-ku, Kyoto, Japan

[21] Appl. No.: 863,803

[22] Filed: May 9, 1986

Related U.S. Application Data

[63] Continuation of Ser. No. 507,795, Jun. 24, 1983, abandoned.

[30] Foreign Application Priority Data

Jul. 9, 1982 [JP] Japan ................. 57-120341

[51] Int. Cl.⁴ ............................................ B62M 1/04
[52] U.S. Cl. ................................. 280/255; 192/41 A; 192/43.1; 192/46; 192/47; 192/64; 192/96; 280/282
[58] Field of Search ............... 280/253, 255, 256, 257, 280/258, 278, 286, 287, 282; 192/46, 47, 41 A, 96, 45.1, 71, 75, 101, 64

[56] References Cited

U.S. PATENT DOCUMENTS

| 350,995 | 10/1886 | Rich | 192/46 |
|---|---|---|---|
| 446,670 | 2/1891 | Elliott | 280/255 |
| 642,927 | 2/1900 | Schneider | 192/46 X |
| 893,684 | 7/1908 | Whitcomb | 192/96 X |
| 1,443,997 | 2/1923 | McLaughlin | 280/255 X |
| 2,630,333 | 3/1953 | Petersen | 280/255 |
| 3,301,366 | 1/1967 | Steinberg | 192/96 |
| 3,432,015 | 3/1969 | Schwerdhofer | 192/41 A X |
| 3,891,235 | 6/1975 | Shelly | 280/252 |
| 4,453,729 | 6/1984 | Lucken | 192/46 X |

FOREIGN PATENT DOCUMENTS

| 535513 | 2/1955 | Belgium | 280/287 |
|---|---|---|---|
| 1334511 | 7/1963 | France | 192/96 |
| 2419209 | 11/1979 | France | 280/255 |
| 434122 | 4/1948 | Italy | 280/287 |
| 447579 | 4/1949 | Italy | 280/287 |
| 454479 | 1/1950 | Italy | 280/287 |
| 15399 | of 1897 | United Kingdom | 280/255 |
| 104447 | 3/1917 | United Kingdom | 192/46 |
| 160501 | 3/1921 | United Kingdom | 280/253 |
| 515712 | 12/1939 | United Kingdom | 192/47 |
| 875366 | 8/1961 | United Kingdom | 280/252 |

Primary Examiner—John J. Love
Assistant Examiner—Mitchell J. Hill
Attorney, Agent, or Firm—Koda and Androlia

[57] ABSTRACT

A driving device for bicycle comprising a pedal system having a left and a right pedal which repeat reciprocating motion and a hub section provided with a left and a right driving force transmission mechanism for transmitting the treading force applied to each pedal to the driving wheel independently, the aforesaid driving force transmission mechanism transmits the forward torque imparted through the pedal to the driving wheel but does not transmit the rearward torque and is provided with a clutch mechanism for disconnecting the connection between the driving wheel and the pedal when the driving wheel reverses as the bicycle is moved back. When the pedals are treaded for reciprocating motion, the driving wheel is rotated in the forward sense to move the bicycle forward and even when the left and right pedals are interlocked so that they can be treaded alternately, reversing the driving wheel is feasible so that the bicycle can be also moved back.

2 Claims, 13 Drawing Figures

DRIVING DEVICE FOR BICYCLE

This is a continuation of application Ser. No. 507,795, filed June 24, 1983, now abandoned.

BACKGROUND OF THE INVENTION

1. Field of the Invention

The present invention relates to a driving device of bicycle and, more particularly, to a driving device of a type of bicycle which is driven through reciprocating motion of pedals.

2. Prior Art

It has been a common method of obtaining driving force for bicycle (force with which bicycle is driven) by treading a left and a right pedal designed to rotate in a predetermined circular path. Since the driving force obtained through rotation of pedals varies following a cosine curve, being maximum when the pedal's crank is horizontal, and there is a problem that in the vicinities of the upper and lower dead point the treading force is seldom converted into the driving force, the result being that with such a bicycle the driving force generated is intermittent and the driving efficiency is hence low. In order to overcome this problem, various proposals have been made in which rotary or straight-moving pedals are used to undergo alternate reciprocating motion for their motion to be transmitted to the driving wheel for the bicycle to be driven thereby. This way, the upper or lower dead point of poor driving efficiency can be eliminated with additional feature of driving force being generated continuously. To cite a concrete example, there is disclosed in U.S. Pat. No. 3,891,235 a bicycle driving device comprising each one ratchet wheel device on both sides of the driving wheel which transmits to the wheel rotation in one direction but does not transmit thereto rotation in the opposite direction so that the motion of the left and right pedals of the straight motion type is transmitted via the aforesaid ratchet wheel devices to the driving wheel.

With this driving device, however, while it is possible to run forward with the pedals being treaded or coast with the pedals stopped, no arrangement is made for allowing moving back the bicycle. When the left and right pedals are interlocked to move in the directions opposite to each other, the chains linking the pedal and the driving wheel are bound to move also in the opposite directions to each other and, since the left and right chains are pulled in the same direction via the ratchet wheel devices when attempt is made to reverse the driving wheel to move back the bicycle, it is infeasible to reverse the driving device. This can be advantageous in that the bicycle would not move back on, for instance, an up-slope, but at the same time it is a fatal drawback in maneuverability for it cannot be moved back as it is taken out of or into an warehouse or the like.

SUMMARY OF THE INVENTION

It is, therefore, a principal object of the present invention to sizably improve the practical value of a bicycle through facilitating generation of driving force with an improved efficiency and, moreover, continuously.

Another object of the present invention is to provide a driving device for bicycle, which enables generation of driving force with an improved efficiency and, moreover, continuously through reciprocating motion of the left and right pedals without interfering with moving back of the bicycle.

In order to attain the above objects, the driving device of bicycle of the present invention is made in the following construction. It comprises a pedal system having each one left and right pedal which undergoes reciprocating motion, a hub section provided with each one left and right driving force transmitting mechanism for transmitting the treading force applied to each pedal to the driving wheel independently, and a clutch mechanism provided in the aforesaid driving force transmission mechanism, which transmits the forward torque imparted through the pedal to the driving wheel but does not transmit the rearward torque and serves to disconnect the connection between the driving wheel and the pedal when the driving wheel is reversed for rearward movement of the bicycle.

With the driving device of the present invention in the above-described construction it is not only possible to run the bicycle forward by treading the pedals or let it coast forward without treading the pedals but also possible to move the bicycle rearward, and the practical value of the bicycle can be markedly improved thereby for efficient and continuous generation of driving force is then feasible by setting the left and right pedals into reciprocating motion.

BRIEF DESCRIPTION OF THE DRAWINGS

In the accompanying drawings referred to in describing a number of preferred embodiments of the present invention.

DETAILED DESCRIPTION OF THE INVENTION

Figure 1A:
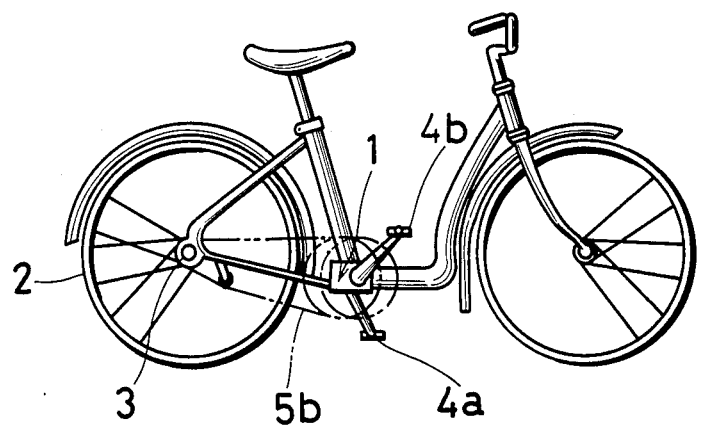
FIGS. 1 (*a*) and (*b*) are a side view and a plan view respectively of a bicycle provided with a driving device of the present invention, FIGS. 2 (*a*) and (*b*) are a side view and a plan view respectively of another bicycle provided with the driving device of the present invention, FIGS. 3 (*a*) and (*b*) are a side view and a plan view respectively of still another bicycle provided with the driving device of the present invention, FIGS. 4 (*a*) and (*b*) are partially cutaway plan views of further modifications of the hub section of the driving device of the present invention, FIGS. 5 (*a*) and (*b*) are fragmentary sectional views of the clutch mechanism of the device in FIG. 4.
Figure 1B:
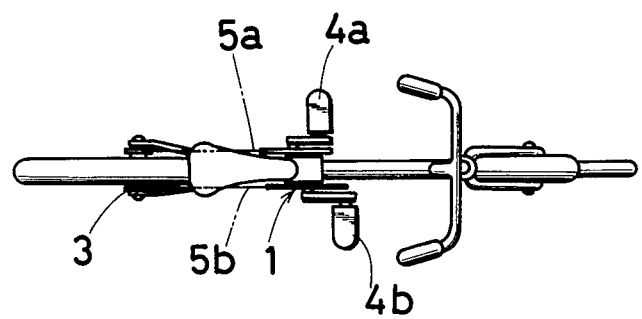
Figure 2A:
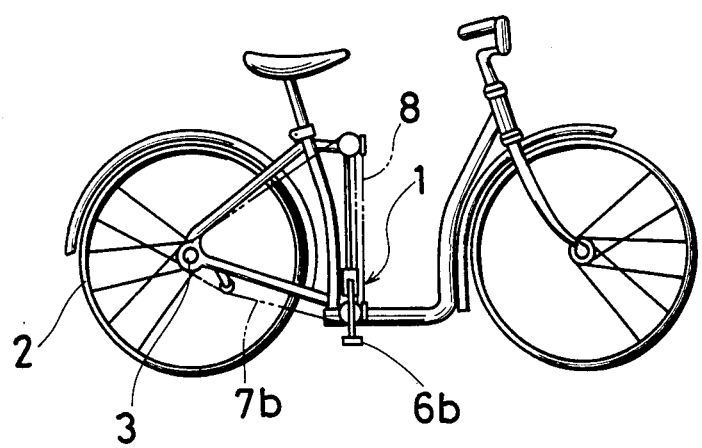
Figure 2B:
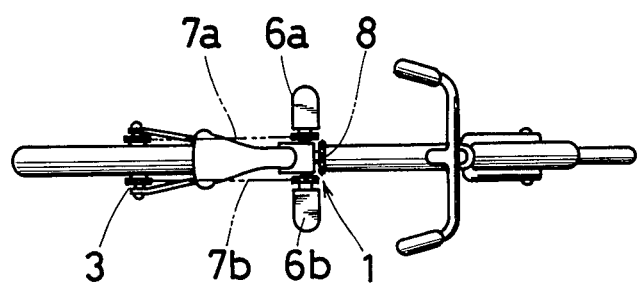
Figure 3A:
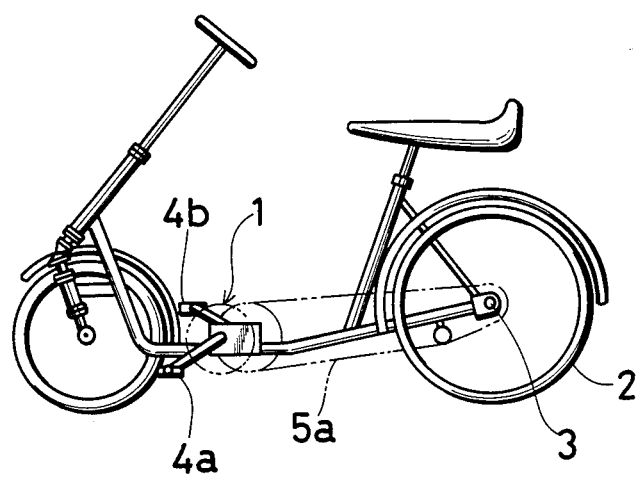
Figure 3B:
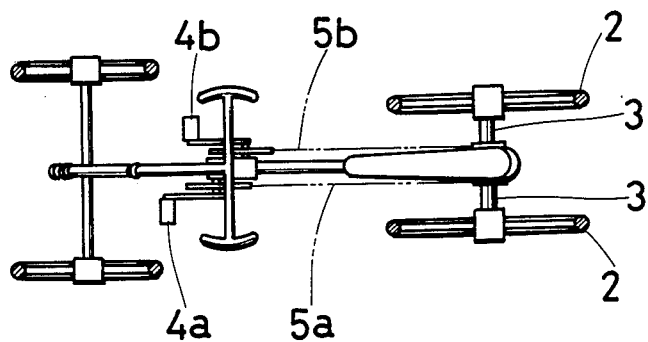

Referring first to FIGS. 1 through 3, an outline of a bicycle provided with a driving device of the present invention will now be described.

In the figures reference numeral 1 designates a pedal system, numeral 2 a driving wheel and numeral 3 a hub section of the driving wheel 2.

FIG. 1 shows an embodiment in which the pedal system 1 used is of the rotary type. The pedal system 1 is provided with rotary pedals 4*a*, 4*b*, and the treading forces applied to the pedals 4*a*, 4*b* are transmitted to the driving wheel 2 via chains 5*a*, 5*b* set to link the pedal system 1 with the hub section 3.

Shown in FIG. 2 is another embodiment in which the pedal system 1 used is of the straight-treading type. The pedal system 1 is provided with pedals 6a, 6b of the straight-treading type and the treading forces applied are transmitted via driving chains 7a, 7b to the driving wheel 2. Reference numeral 8 designates an interlocking chain for pedals 6a, 6b.

FIG. 3 shows a four wheeler having two driving wheels 2 and provided with the same rotary pedal system 1 as shown in FIG. 1, so designed that the treading force is transmitted via chains 5a, 5b to the left and right driving wheels 2, 2 separately.

As to the concrete construction of the essential parts of the above structures, detailed description will be given about the embodiments show in and after FIG. 4 onward.

Now referring to FIGS. 4 through 8, described below is one embodiment of driving force transmission mechanism provided with a clutch mechanism.

In this embodiment there is provided between the hub shell 11 and the drivers 13a, 13b a clutch mechanism comprising a ratchet gear 35a or 35b and a ratchet pawl 36a or 36b. The ratchet gear 35a, 35b, are formed at both ends of the bore of the hub shell 11 as internal gears, while the ratchet pawls 36a, 36b are attached to the inner end faces of the drivers 13a, 13b by means of pins 37 to be engaged with the ratchet gears 35a, 35b during forward rotation of the drivers 13a, 13b for the rotation of the drivers 13a, 13b to be transmitted to the hub shell 11. Although the ratchet pawls 36a, 36b are constantly biased by the springs 38 in the direction to engage with the ratchet gears 35a, 35b, this engagement can be released by means of the clutch control mechanism acting on the ratchet pawls 36a, 36b to turn them in the direction opposite to that of the biasing force of the springs 38.

Figure 6:
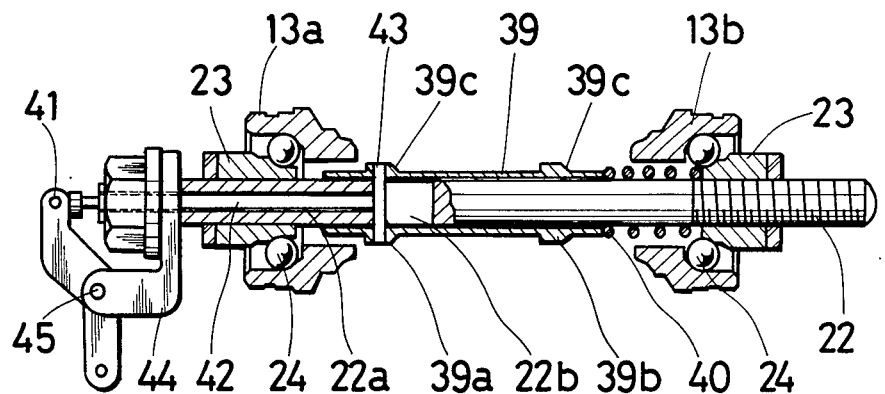
FIG. 6 is a partially cutaway plan view showing the construction of the clutch control mechanism of the device in FIG. 4.
Figure 7:
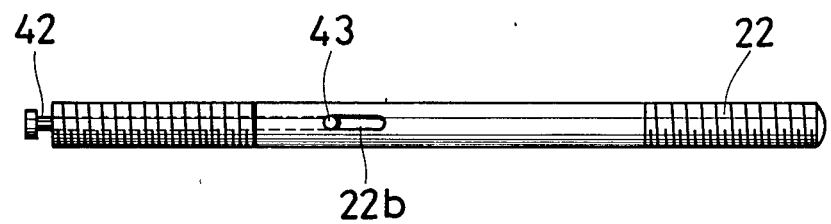
FIG. 7 is a front view of the rod and hub shaft of the clutch control mechanism of the device in FIG. 4.

The above clutch control mechanism comprises a slider 39 carried by the hub shaft 22 to be shiftable axially thereon, a restitution spring 40 for the slider 39 and a control lever 41 for controlling the position of the slider 39 via a rod 42, and the slider 39 has formed therein large diameter portions 39a, 39b corresponding to the ratchet pawls 36a, 36b. As shown in FIGS. 6 and 7 in detail, the hub shaft 22 has formed a longitudinal hole 22a therein and has the rod 42 set therethrough, the hub shaft 22 has an oblong hole 22b diametrically through it where the tip portion of the rod 42 is located, a pin 43 passing through the slider 39 diametrically is set through the oblong hole 22b and the tip of the rod 42 is in contact with the pin 43. The control lever 41 is attached to the bracket 44 by means of a shaft 45 and its tip is connected to the head of the rod 42. When the control lever 41 is turned to push in the rod 42 against the force of the restitution spring 40, the slider 39 is shiftable within a range corresponding to the length of the oblong hole 22b. The control lever 41 for shifting the slider 39 is to be operated by the rider of the bicycle. It may be directly operated by a foot or via a manipulating lever connected with the control lever 41 e.g. by means of a wire, which manipulating lever may be attached to the handle or where it is considered proper on the bicycle's frame.

Figure 4A:
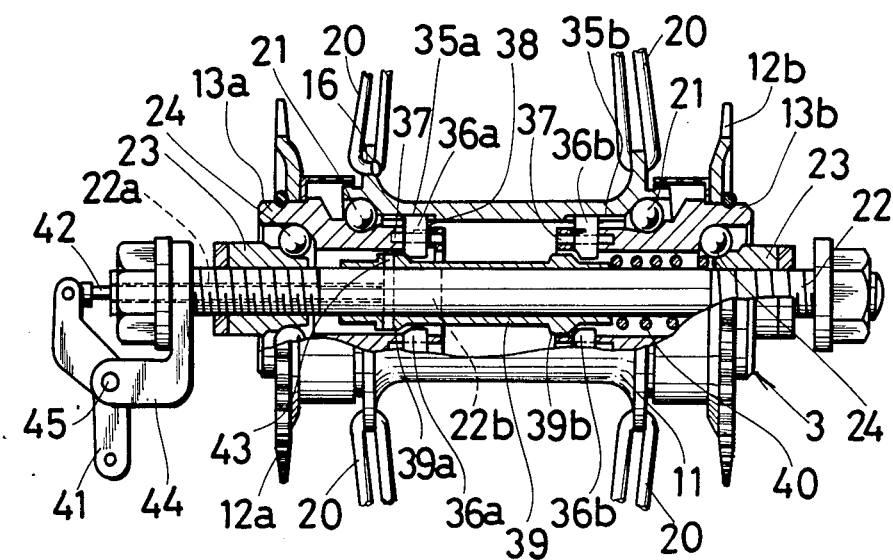
Figure 4B:
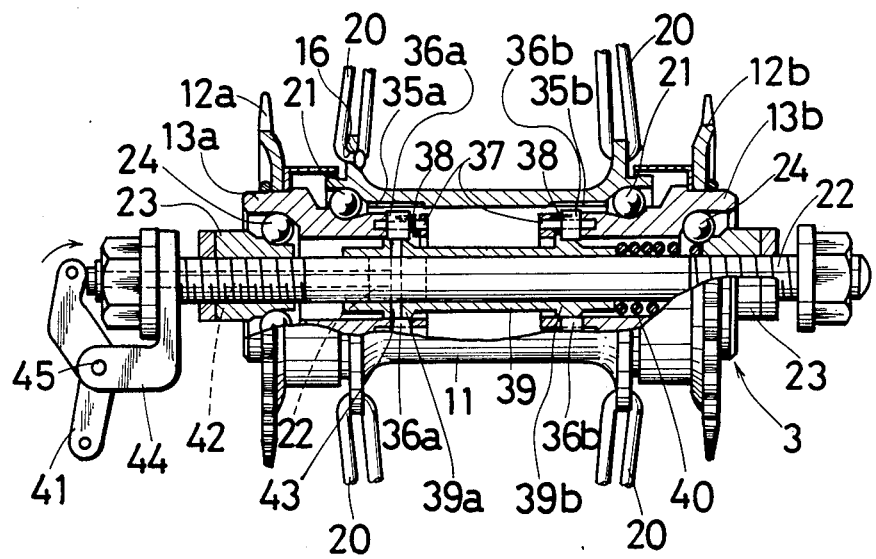
Figure 5A:
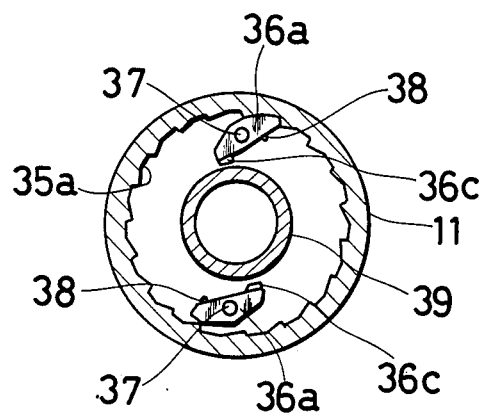
Figure 5B:
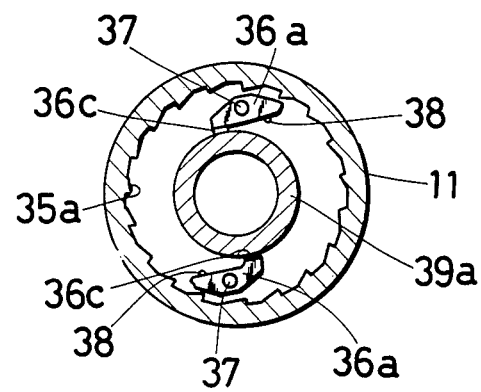

FIG. 4 (a) shows the condition in which the slider 39 is shifted to the left (in the figure) and the clutch mechanism is turned on, the large diameter portions 39a, 39b of the slider 39 being off the ratchet pawls 36a, 36b. Hence the ratchet pawls 36a, 36b are engaged with the ratchet gears 35a, 35b as shown in FIG. 5 (a) so that the bicycle can be driven forward by setting the drivers 13a, 13b in forward rotation, and it is also allowed to coast with both drivers 13a, 13b stopped.

Meanwhile, although it is normally infeasible to move back the bicycle when the described mechanism is combined with a pedal system with its left and right pedals interlocked to move in the opposite directions as already mentioned above, this embodiment is adapted to make it feasible through release of the engagement between the ratchet pawls 36a, 36b and the ratchet gears 35a, 35b. In FIG. 4 (a) the control lever 41 is to be rotated clockwise to push in the rod 42 so as to shift the slider 39 to the right as shown in FIG. 4 (b). It is so arranged that the large diameter portions 39a, 39b are then located to agree with the positions of the ratchet pawls 36a, 36b, i.e. they come into contact with the rear ends of the ratchet pawls 36a, 36b to tip them and the engagement with the ratchet gears 35a, 35b is then released as shown in FIG. 5 (b). The hub shell 11 is now freely rotatable and it is feasible to move back the bicycle.

In the illustrated embodiment the restitution spring 40 is provided in a compressed condition, but it is as well possible to use a tension spring instead to pull the slider 39 thereby via a wire or chain. It is also possible to retain the rod 42 in the pushed-in position by imparting to where the control lever 41 is held by the shaft 45 a resistance large enough to overcome the force of the restitution spring 40, or any other suitable retarding mechanism may be used to retain the slider 39 in the above-mentioned position. The faces of the large diameter portions 39a, 39b and of the ratchet pawls 36a, 36b which come into contact with each other are properly tapered (39c, 36c) so as to allow smooth movement of the slider 39.

Figure 8:
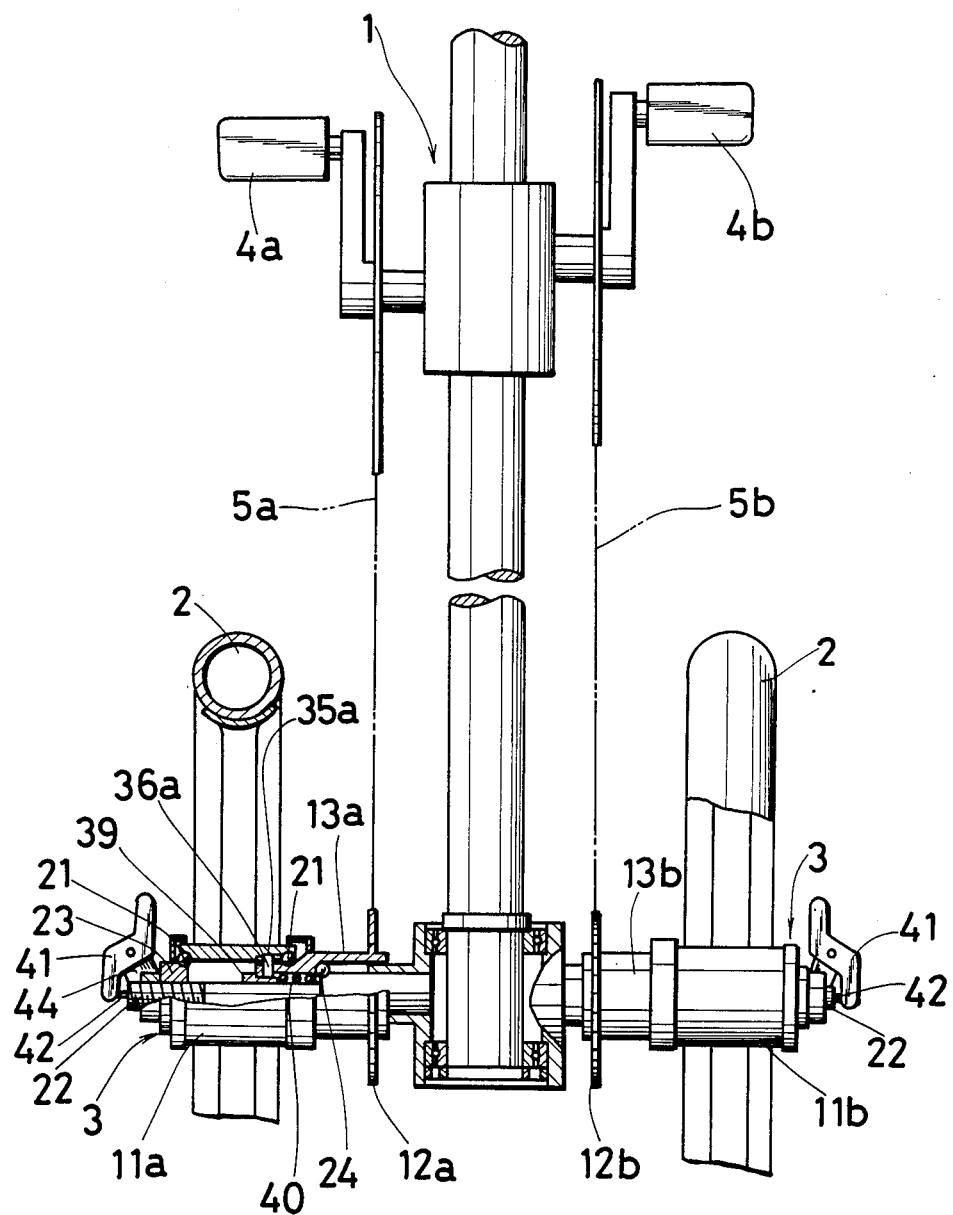
FIG. 8 is a partially cutaway plan view of the device in FIG. 4 as it is applied to a bicycle shown in FIGS. 3 (*a*) and (*b*).

The above-described embodiment is of a bicycle with a single driving wheel 2 as shown in FIGS. 1 and 2, but it is also possible to apply the same construction to a four wheeler (or three wheeler) having two driving wheels 2 as shown in FIG. 3. FIG. 8 is given to show such an embodiment, in which the hub shell is divided into right and left halves, the left and right hub shells 11a, 11b are formed to be integral with each one driving wheel 2 and it is so arranged that the driving force is transmitted to the left and right hub shells 11a, 11b separately or independently. Its construction is, however, basically identical except that the hub shell is divided, i.e. in that separate, left and right, drivers 13a, 13b and clutch mechanisms are provided. Hence, in order to avoid overlapping, corresponding parts are designated by the same reference numerals and detailed description is omitted. Although in the figure the clutch control mechanism is provided for the left and right driving wheels separately, this may as well be provided in common for both wheels.

The embodiments described above are but few examples of application of the present invention and, needless to say, this invention is not limited to or by the cited embodiments and many modifications are feasible within the scope of the present invention set forth in the appended claims.

What is claimed is:

1. A driving device of a bicycle including a pedal system having a left and a right pedal which undergo repeated reciprocating motion and a hub section having a left and a right uni-directional clutch mechanism for transmitting treading force applied to each pedal independently to a driving wheel as forward torque, wherein the improvement comprises a clutch control means which is operable by a rider to disconnect a connection between the pedals and the driving wheel such that the driving wheel can be rotated in a reverse direction without transmitting the reverse rotation to the left and right pedals and said hub section comprises:

left and right drivers each having a sprocket fixedly mounted on its periphery and being freely rotatable on a hub shaft set therethrough at the center thereof;

a hub shell of said driving wheel being freely rotatable with respect to said driver;

a clutch mechanism provided between each driver and said hub shell; and a clutch control mechanism serving as a control mechanism according to manipulation by the bicycle rider and also acting to connect each driver and said hub shell or disconnecting the same therefrom; wherein said clutch mechanism includes:

an internal gear type ratchet gear provided in a bore of said hub shell;

a ratchet pawl pivotally attached to said driver;

a slider carried by said hub shaft to be slidable axially thereon;

a control lever to be manipulated by the bicycle rider for controlling the position of said slider; and a large diameter portion formed in said slider for releasing engagement between said ratchet pawl and said ratchet gear through tilting of said ratchet pawl of said clutch mechanism caused by its coming into contact therewith.

2. A driving device of a bicycle as recited in claim 1, wherein said hub shell of said hub section is divided into left and right halves, each said right and left halves having one driving wheel, and each of said left and right hub shells is provided with separate driver and clutch mechanism.

* * * * *